No. 693,975. Patented Feb. 25, 1902.
H. C. LAVERY.
ELECTRICAL OPERATING APPARATUS FOR RAILWAY GATES.
(Application filed Feb. 15, 1901.)
(No Model.) 9 Sheets—Sheet 3.
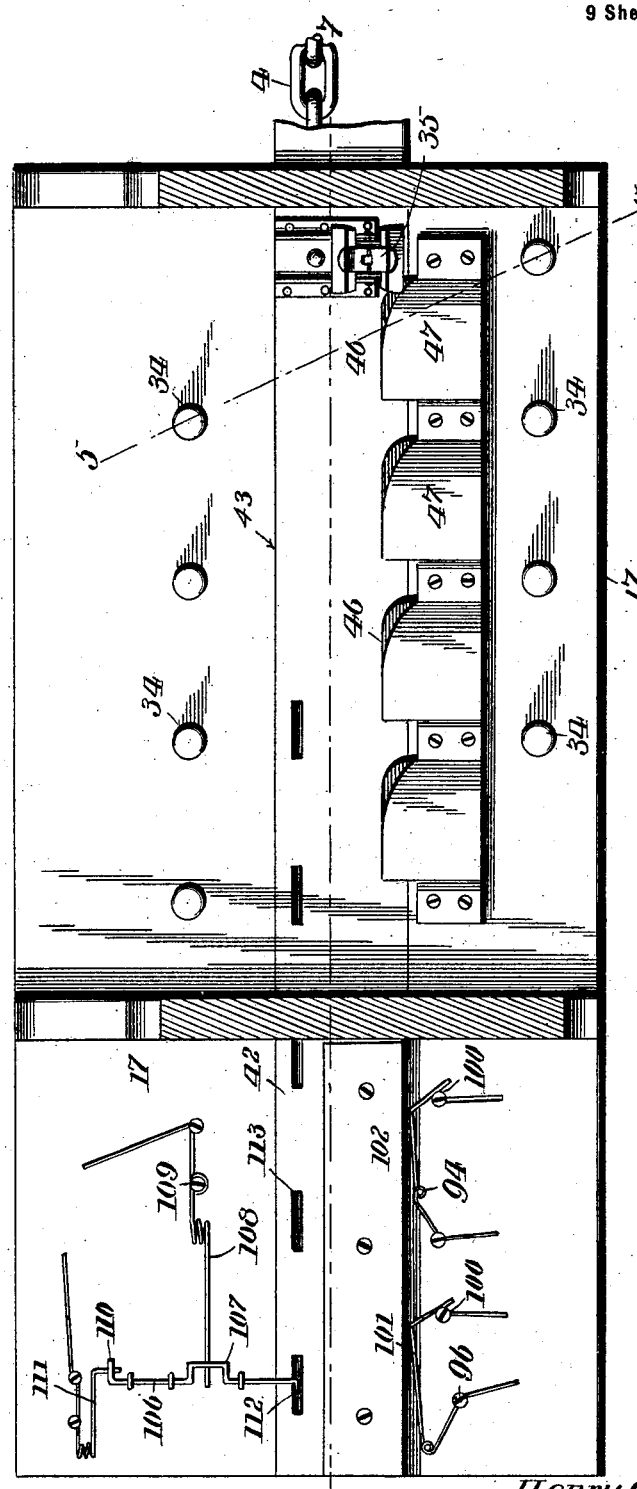
WITNESSES:
INVENTOR
Henry C. Lavery,
BY
Attorney No. 693,975. Patented Feb. 25, 1902.
H. C. LAVERY.
ELECTRICAL OPERATING APPARATUS FOR RAILWAY GATES.
(Application filed Feb. 15, 1901.)
(No Model.) 9 Sheets—Sheet 4.
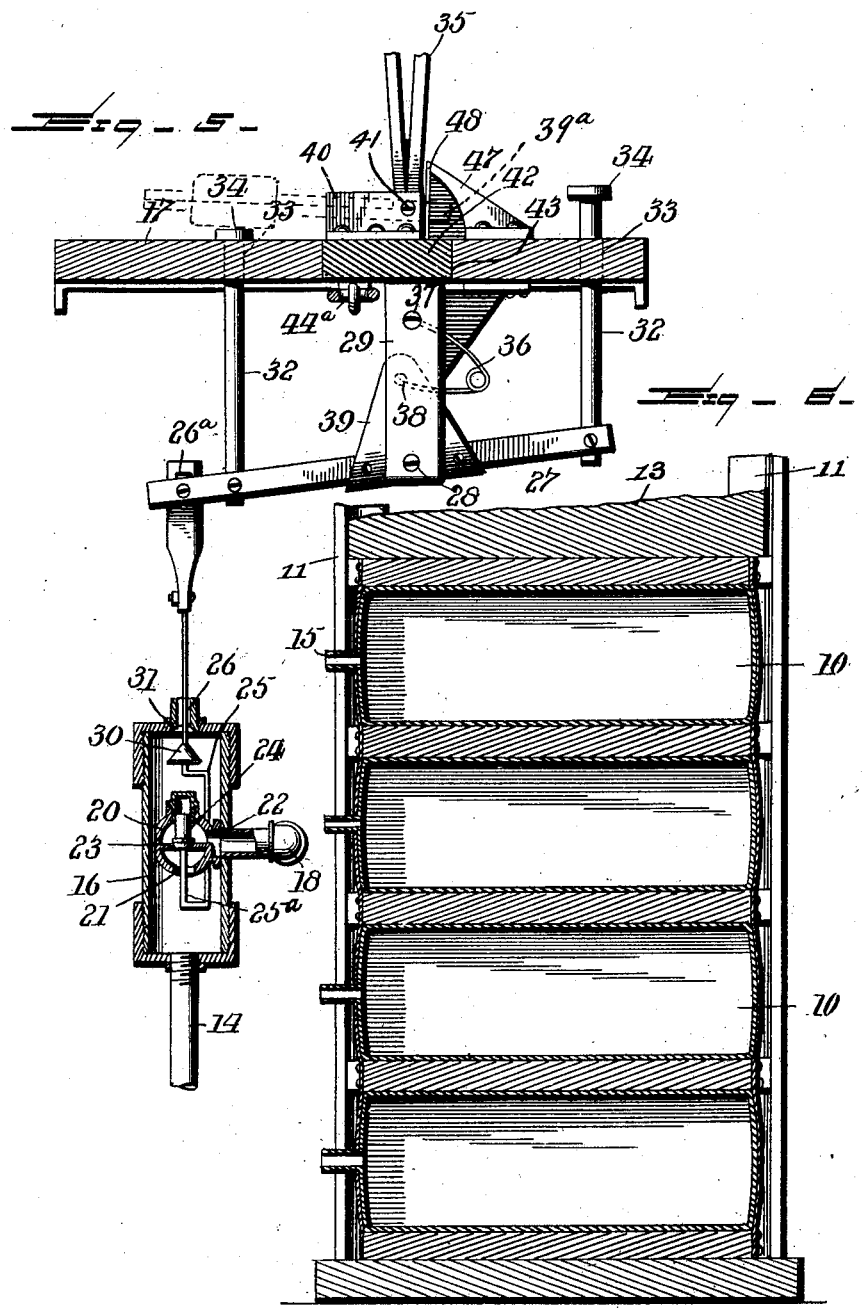
WITNESSES:
INVENTOR
Henry C. Lavery,
BY
Attorney

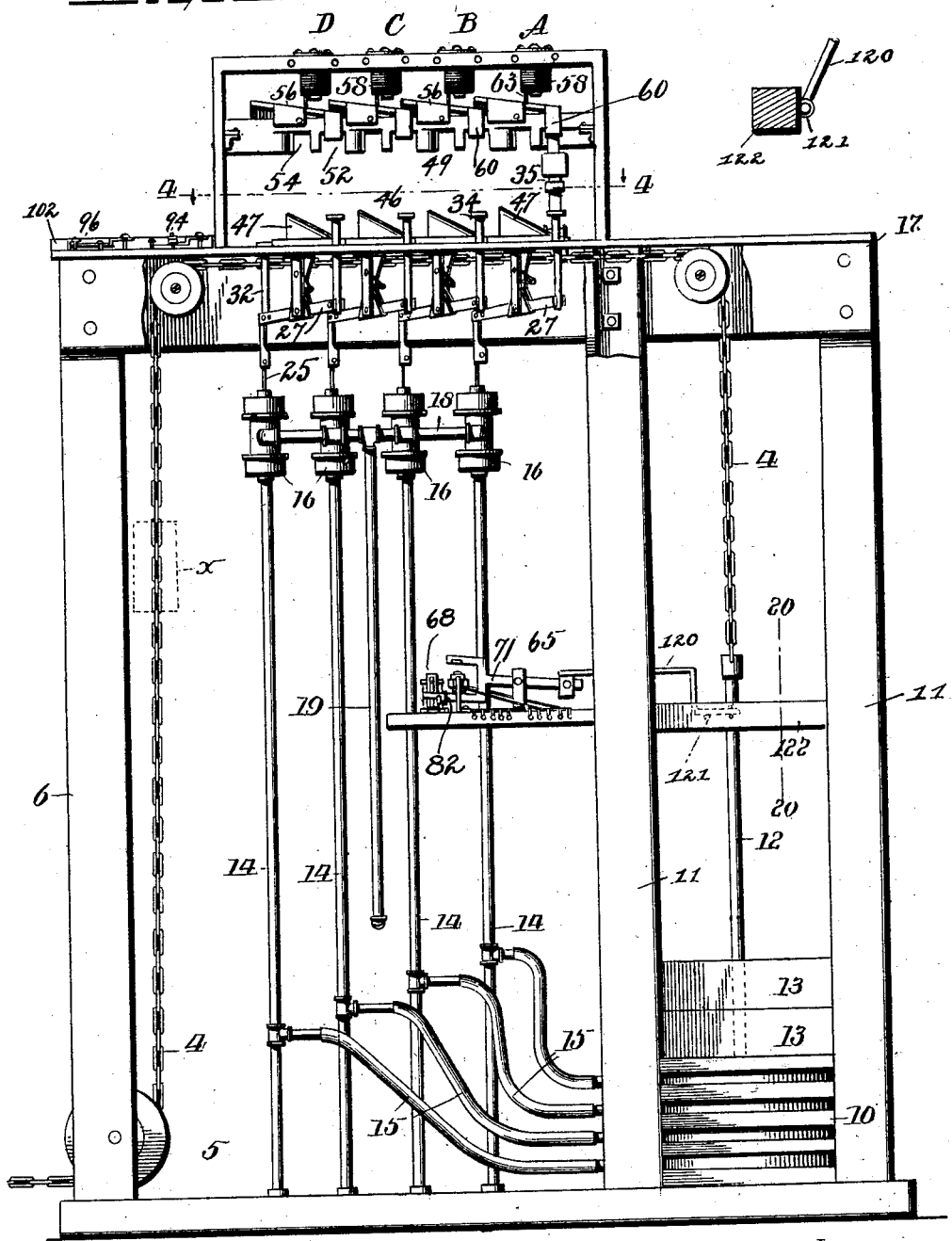

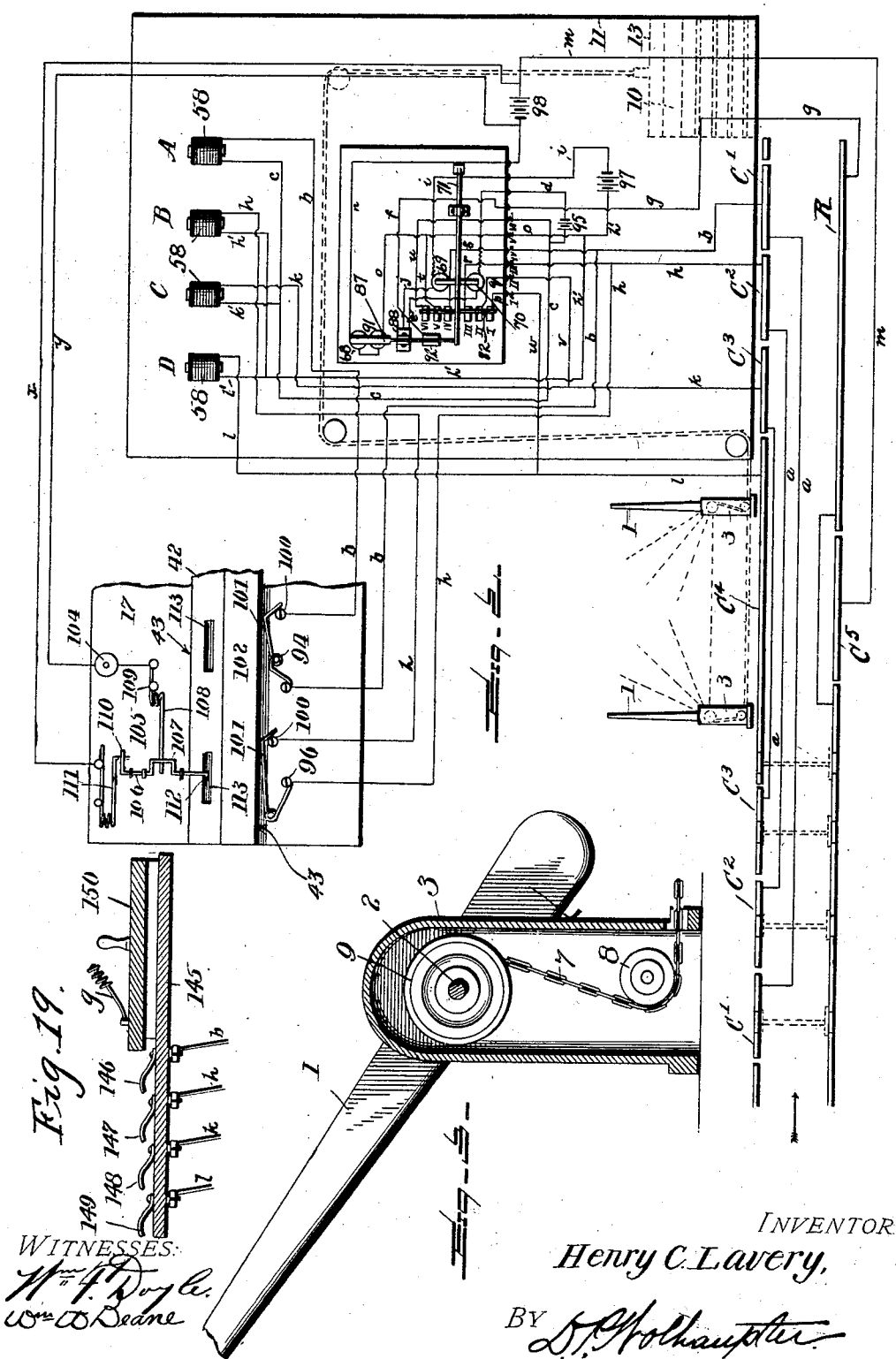

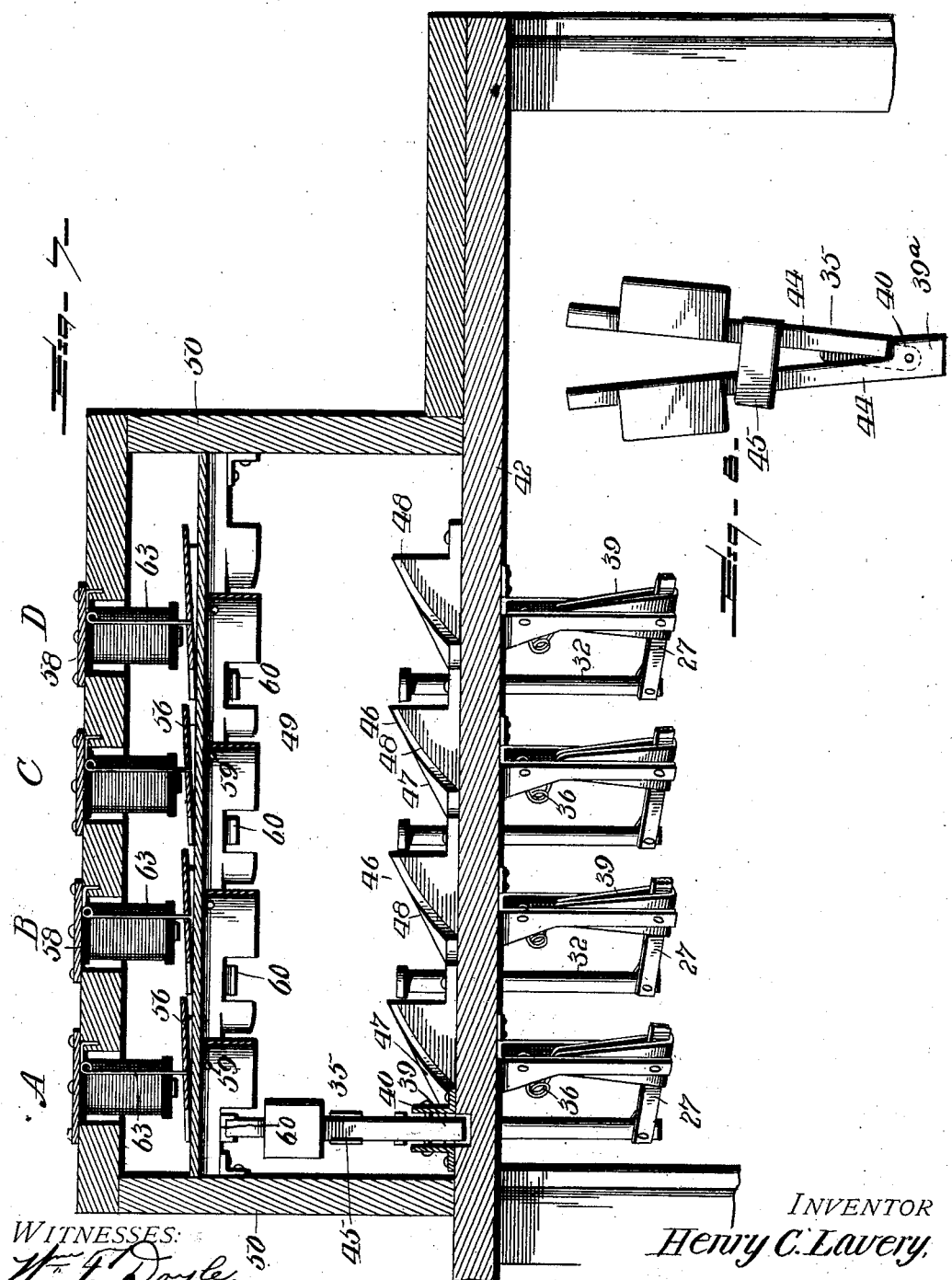

No. 693,975. Patented Feb. 25, 1902.
H. C. LAVERY.
ELECTRICAL OPERATING APPARATUS FOR RAILWAY GATES.
(Application filed Feb. 15, 1901.)
(No Model.) 9 Sheets—Sheet 6.
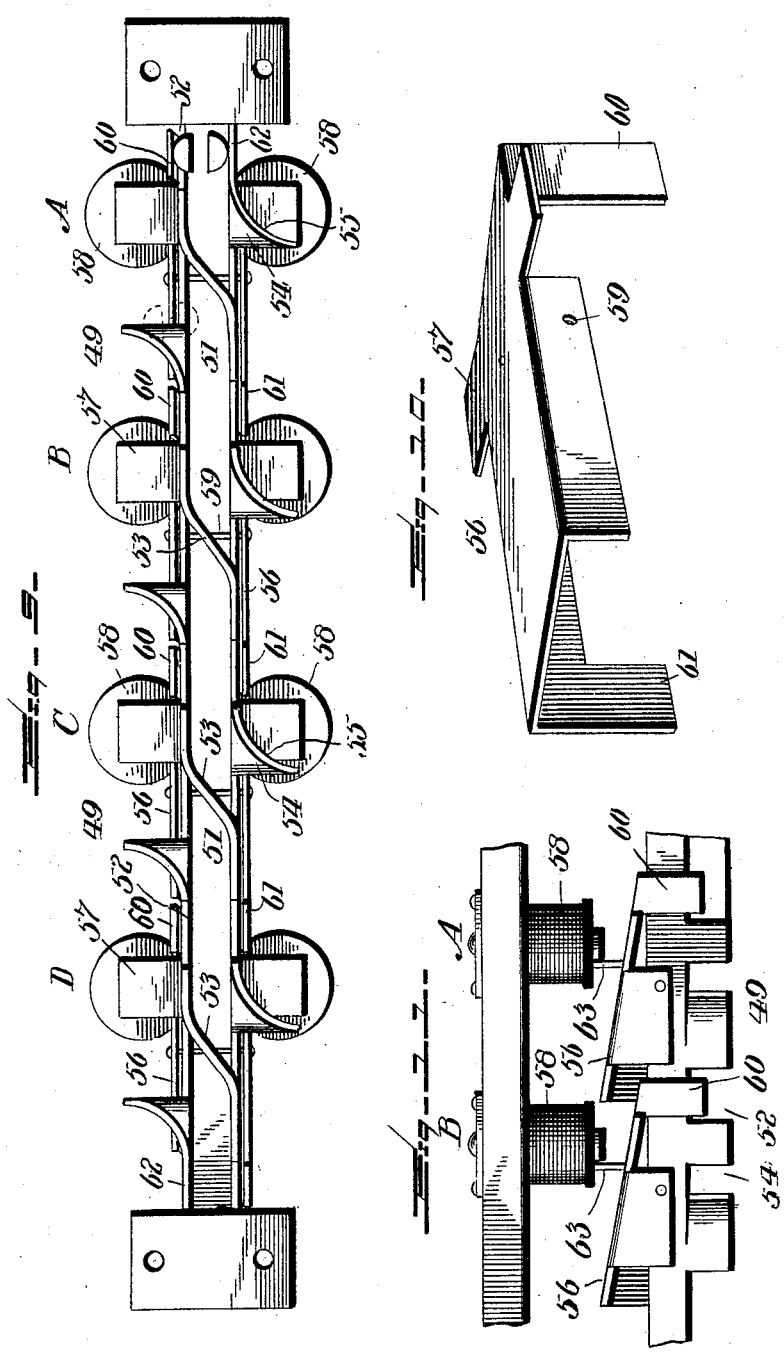
WITNESSES:
Wm F. Doyle
Wm W. Deane
INVENTOR
Henry C. Lavery,
BY D. F. Wolhaupter
Attorney No. 693,975. Patented Feb. 25, 1902.
H. C. LAVERY.
ELECTRICAL OPERATING APPARATUS FOR RAILWAY GATES.
(Application filed Feb. 15, 1901.)
(No Model.) 9 Sheets—Sheet 7.
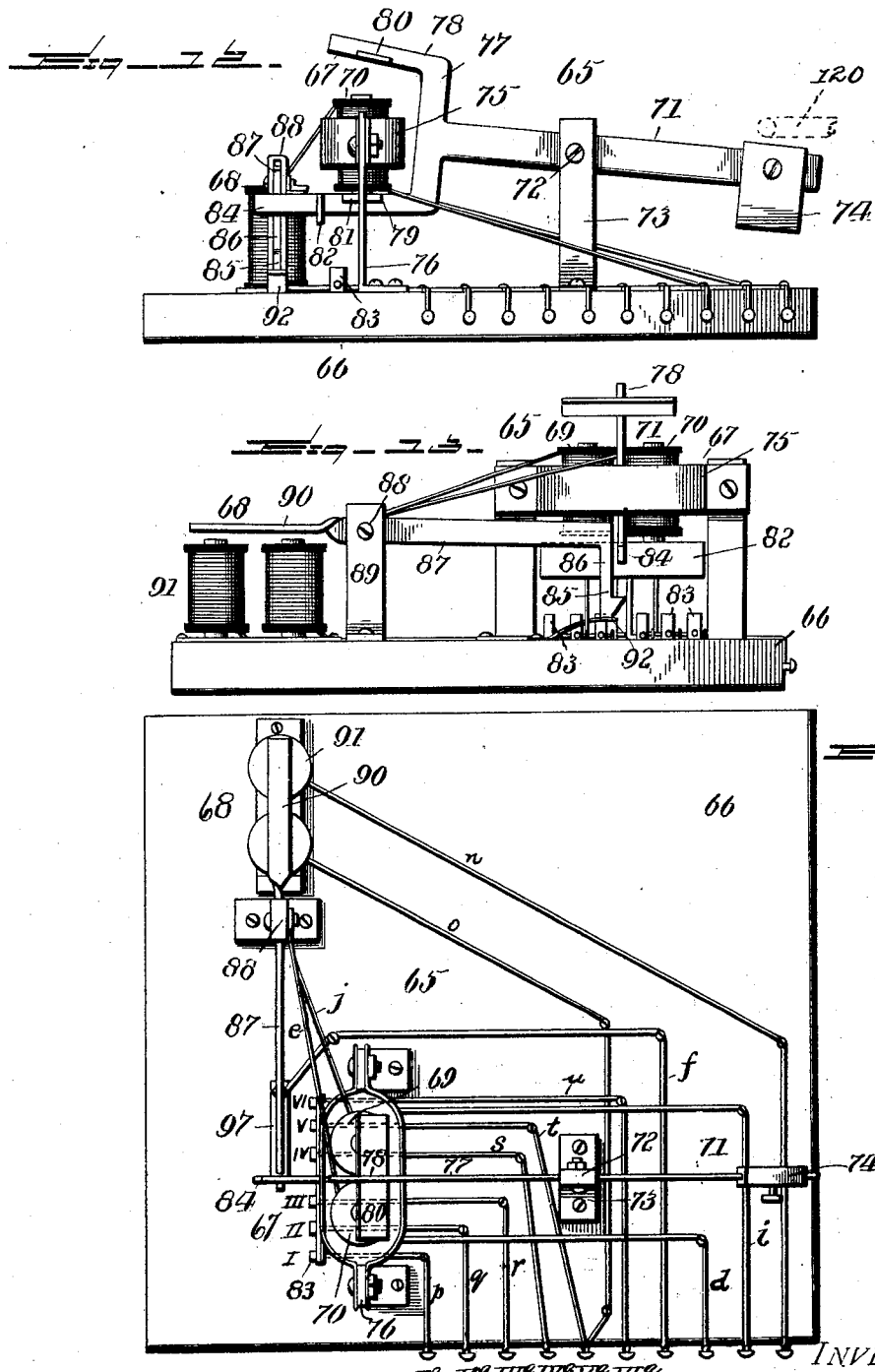
WITNESSES:
INVENTOR
Henry C. Lavery,
BY
Attorney No. 693,975. Patented Feb. 25, 1902.
H. C. LAVERY.
ELECTRICAL OPERATING APPARATUS FOR RAILWAY GATES.
(Application filed Feb. 15, 1901.)
(No Model.) 9 Sheets—Sheet 8.
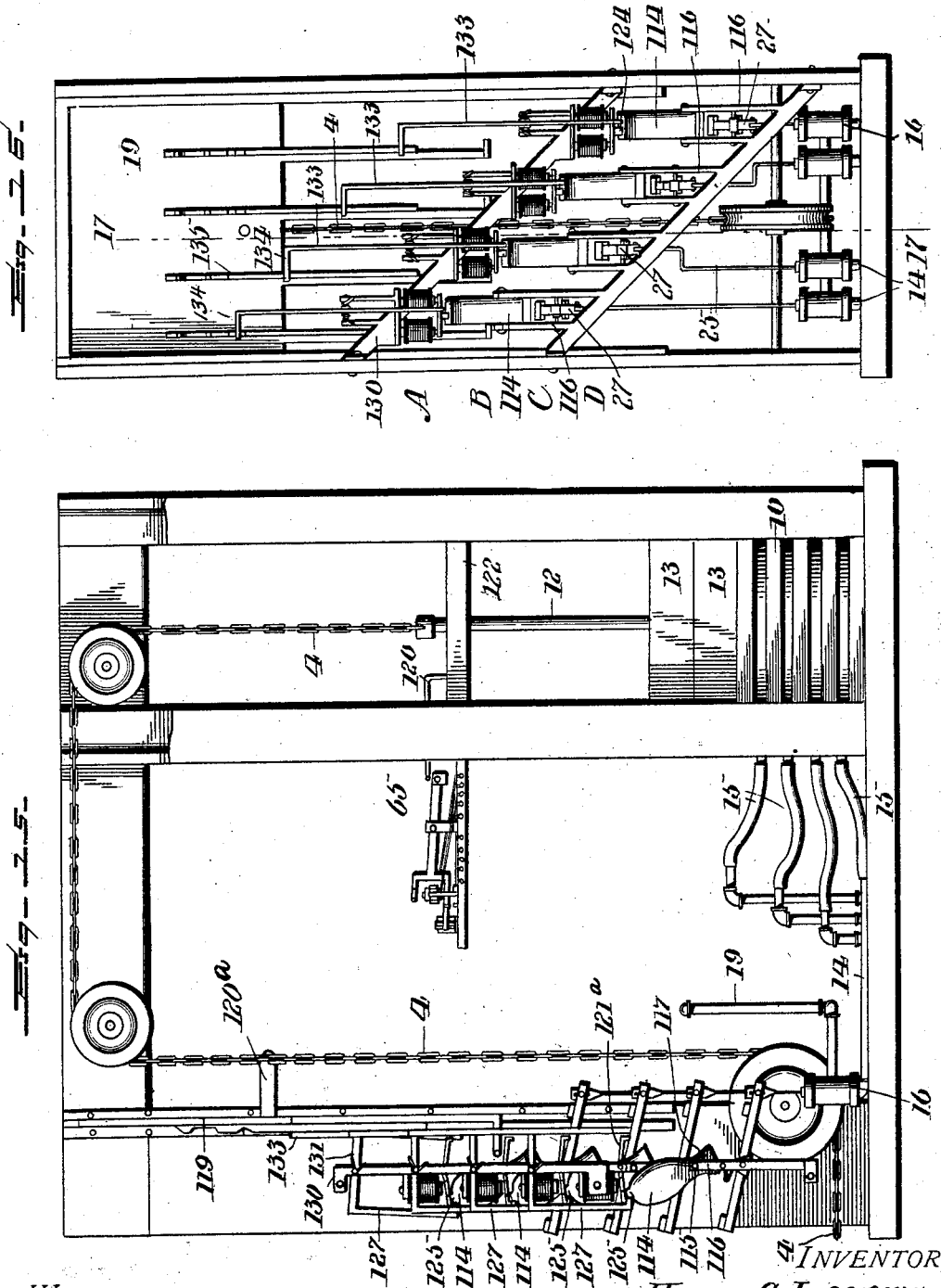
WITNESSES:
INVENTOR
Henry C. Lavery,
BY
Attorney No. 693,975. Patented Feb. 25, 1902.
H. C. LAVERY.
ELECTRICAL OPERATING APPARATUS FOR RAILWAY GATES.
(Application filed Feb. 15, 1901.)
(No Model.) 9 Sheets—Sheet 9.
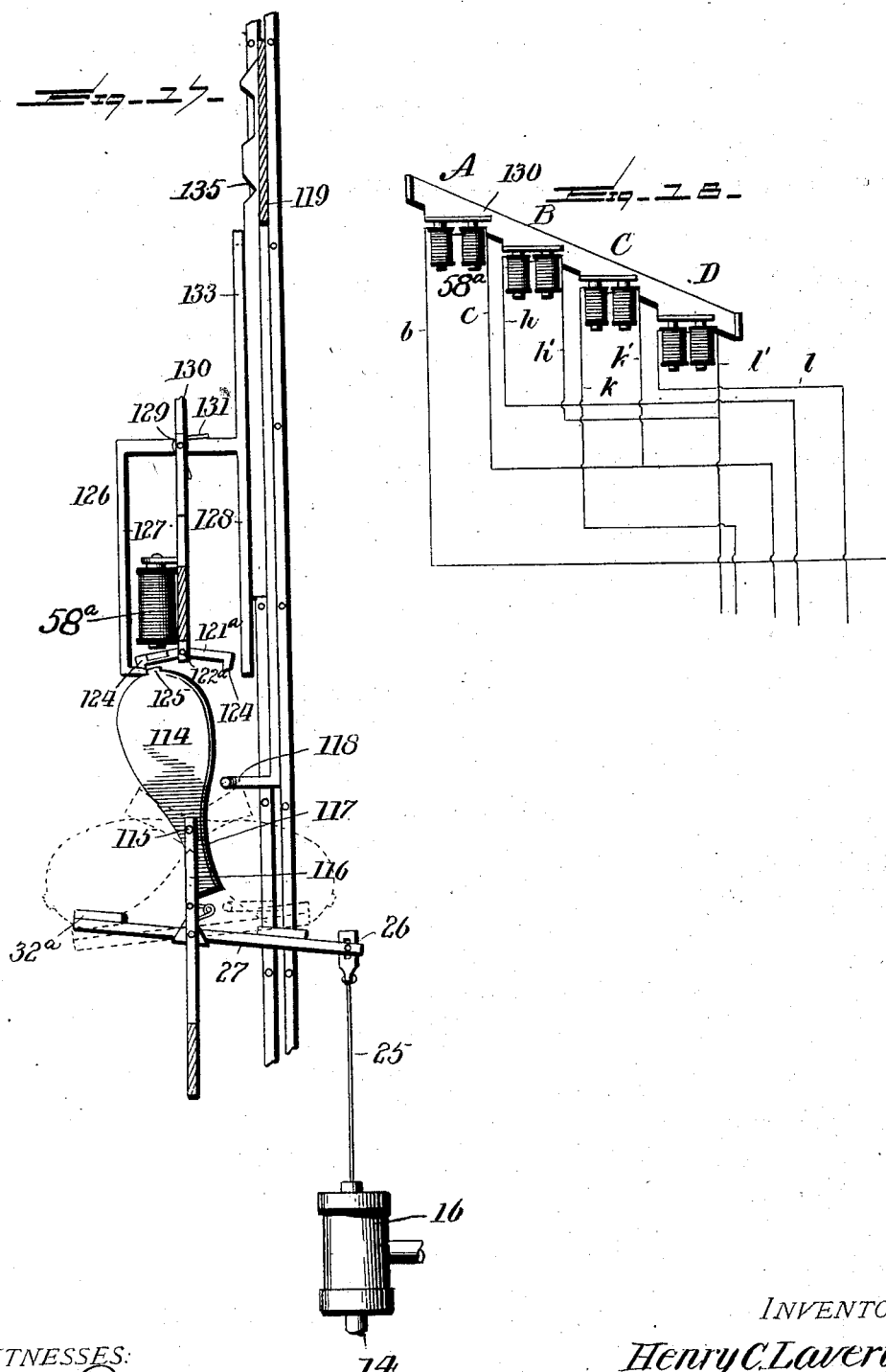
WITNESSES:
INVENTOR
Henry C. Lavery,
BY
Attorney

UNITED STATES PATENT OFFICE.

HENRY C. LAVERY, OF WEST SUPERIOR, WISCONSIN.

ELECTRICAL OPERATING APPARATUS FOR RAILWAY-GATES.

SPECIFICATION forming part of Letters Patent No. 693,975, dated February 25, 1902.

Application filed February 15, 1901. Serial No. 47,496. (No model.)

*To all whom it may concern:*

Be it known that I, HENRY C. LAVERY, a citizen of the United States, residing at West Superior, in the county of Douglas and State of Wisconsin, have invented certain new and useful Improvements in Electrical Operating Apparatus for Railway-Gates; and I do hereby declare the following to be a full, clear, and exact description of the invention, such as will enable others skilled in the art to which it appertains to make and use the same.

This invention relates to railway-gates, and has special reference to mechanism for operating the same.

To this end the invention contemplates an improved motor mechanism comprising means for controlling railway-gates of any approved type in every way that it is possible to control railway-gates by the gateman usually employed for that purpose. In other words, the present invention has in view the provision of an operating or motor mechanism for railway-gates which will entirely dispense with the necessity of a gateman for manually controlling the same in the ordinary way, while at the same time making provision for the operation or movement of the gates in a way to meet every requirement, according to the distance of the train or locomotive from the crossing, according to the speed of the train or locomotive, and also according to whether the same is in motion or at rest.

In the accomplishment of the above objects the invention comprehends a motor or operating mechanism for railway-gates which provides for the movement of the gate-arms in strict conformity with the movement and position of the train, thereby avoiding the serious accidents which frequently occur by reason of the gates being prematurely or too rapidly closed, too rapidly or prematurely opened, and also avoiding the objection of having the gates closed when the position of the train or locomotive does not require it. The motor or operating mechanism comprehends means whereby the gate-arms will follow every movement and position of the train. For instance, if the train is rapidly approaching a crossing the gate-arms will rapidly close in conformity with the rapid speed of the train, or, vice versa, if the train is moving slowly the gate-arms will likewise move slowly. Again, in the event of a train proceeding toward a crossing and then stopping before reaching the same the gate-arms will also cease to move, and if the train recedes from the crossing the said arms will swing upwardly, and thereby provide for again opening the gates.

The invention also contemplates means whereby in the preferred embodiment of the motor or operating mechanism the track will be so divided off that the gate-arms will have a movement corresponding to the position of the train or locomotive with reference to the said sections or divisions of the track, thus insuring the strictest conformity between the direction of travel and speed of the train or locomotive and the movement of the gate-arms.

The invention in its preferred aspect contemplates a strictly automatic motor or operating mechanism for the gate-arms involving an arrangement of track-circuits whereby the results stated may be accomplished effectively and with a minimum expenditure of power; also, to utilize in connection with the motor or operating mechanism proper a circuit-controller whereby the entire apparatus is under absolute control to provide for the movement of the gate-arms not only in conformity with the movement of the train, but also to provide for the immediate elevation of the gate-arms when the last car-axle passes the crossing.

The invention also contemplates an apparatus which can be electrically controlled either through the medium of suitable track connections, thereby rendering the same entirely automatic, or through the medium of corresponding electrical connections which may be controlled from a switch-tower, for instance, in either event, however, a manual operation of the gates being entirely obviated and the movement of the gate-arms being strictly in accordance with the movement of the train.

With these and many other objects in view, which will more readily appear as the nature of the invention is better understood, the same consists in the novel construction, combination, and arrangement of parts hereinafter more fully described, illustrated, and claimed.

The essential features of the invention are necessarily susceptible of a variety of modifications, and, in fact, the entire mechanism or apparatus itself is susceptible of embodiment in a variety of constructions without departing from the spirit or purview of the invention; but for illustrative purposes the preferred embodiments of the invention are shown in the accompanying drawings, in which—

Figure 1 is a general view in elevation of a complete gate-operating apparatus embodying a preferred form of the invention. Fig. 2 is a general diagrammatic view of the apparatus, showing the preferred arrangement in which the railway-track is blocked off into a plurality of electrically-bonded sections and illustrating all of the circuit-wire connections with the various parts of the apparatus. Fig. 3 is a detail view showing a convenient form of operating connection with the railway-gate arm to provide for the control thereof through the medium of the apparatus. Fig. 4 is a horizontal sectional view on the line 4 4 of Fig. 1, viewing in plan the floor upon which is arranged the resetting device for the traveling actuator, beneath which are arranged the several valve mechanisms for controlling the supply of fluid-pressure to the piston devices or fluid-pressure receivers. Fig. 5 is a cross-sectional view on the line 5 5 of Fig. 4, showing one complete valve mechanism and also illustrating the position of the main actuator at one side of the resetting device therefor. Fig. 6 is an enlarged detail sectional view of a preferred form and arrangement of piston devices in their expanded condition. Fig. 7 is a vertical longitudinal sectional view of the top portion of the apparatus, the line of section being taken on the line 7 7 of Fig. 4, but the view including the guideway for the traveling actuator or hammer and the electrically-controlled trip-latches therefor. Fig. 8 is a detail elevation of the preferred form of traveling actuator or hammer which provides for the automatic actuation of the individual valve mechanisms for the piston devices or fluid-pressure receivers. Fig. 9 is a bottom plan view of the guideway for the traveling actuator and of the trips and controlling-magnets associated therewith. Fig. 10 is a detail in perspective of one of the electrically-controlled trip-latches associated with the guideway for the travelling actuator or hammer. Fig. 11 is an enlarged detail elevation of a few of the electrically-controlled trip-latches and a portion of the guideway with which they are associated. Fig. 12 is a side elevation of the circuit-controller with the parts thereof in one position. Fig. 13 is a similar view in a different position and viewing the circuit-controller at right angles to the view of Fig. 12. Fig. 14 is a plan view of the circuit-controller. Fig. 15 is a side elevation showing a modified construction of apparatus for carrying out the invention. Fig. 16 is an end elevation of the said modified type of apparatus. Fig. 17 is a detail vertical sectional view on the line 17 17 of Fig. 16, showing one of the individual valve mechanisms and the electrical controlling means therefor. Fig. 18 is a detail diagrammatic view showing the stepped order of the controlling-magnets and the circuit-wire connections therewith. Fig. 19 is a detail view of a form of tower-switch or switchboard that may be employed in place of the sectional rails. Fig. 20 is a detail sectional view on the line 20 20 of Fig. 1.

Like characters of reference designate corresponding parts in the several figures of the drawings.

In carrying out the invention it is the purpose to provide a gate-operating apparatus which can be associated with any of the usual types of railway-gates ordinarily employed at railway-crossings, and it is therefore unimportant precisely what style of swinging gate may be equipped with the apparatus; but for illustrative purposes there is shown in the drawings the ordinary form of railway-gate consisting of the swinging gate-arms 1, mounted upon the axles 2, turning within the pedestals 3, arranged at opposite sides of the street, road, or crossing, and to permit of the carrying out of the invention in connection with the forms of apparatus shown in the drawings the said gate-arms are counterbalanced so as to tend to fall. Any of the ordinary expedients may be resorted to for causing the two sets of gates at opposite sides of the track to move in unison; so for the purposes of this application it has only been deemed necessary to illustrate in the drawings one of the sets consisting of the oppositely-arranged swinging gate-arms 1. To arrange for holding the gate-arms normally elevated to provide a normally open gate, the apparatus in its general organization includes a gate-operating connection 4, which may be conveniently in the form of a cable passing over suitably-arranged guide-pulleys 5, mounted within the supporting-frame 6 of the apparatus, which supporting-frame and the several appurtenances and mechanisms of the apparatus are designed to be incased within a suitable housing located at any suitable or desirable distance from the crossing where the gates are located. The gate-operating connection or cable 4, leading from the controlling or operating apparatus, may be connected with the gate-arms in any suitable manner, or, in fact, any other equivalent operating connection may be associated with the gate-arms; but in the construction shown the cable 4 has branch sections 7, passing over guide-pulleys 8 within the pedestals for the oppositely-located gate-arms and connected with drums 9, mounted on the axles 2 of the gate-arms, whereby the latter are placed under the direct control of the apparatus both in the raising and lowering thereof, it being understood that the weight of the arms at one side of their pivots is sufficient to lower the arms when the tension of the connection is relaxed, as well as operate a certain portion of the apparatus, although should it be necessary in order to secure this latter result an additional weight might be utilized at a proper point in the line of the gate-operating connection or cable 4, as indicated by the dotted lines $x$, for instance, in Fig. 1 of the drawings.

To provide for swinging the gate, the apparatus includes an actuator for the gate-operating connection, said actuator comprising a series of actuator devices which are so arranged as to be successively brought into play, but all of which are associated directly with the gate-operating connection 4 to provide for controlling the movement thereof. The said actuating devices may assume different mechanical forms; but an exemplification of this part of the apparatus is shown in the drawings which consists of a series of superposed collapsible fluid-pressure receivers 10, which may be properly called "bellows," inasmuch as the same are of collapsible and expansible nature; but in employing fluid-pressure receivers of this type the same necessarily have no intercommunication, inasmuch as they are independently supplied with fluid or exhausted thereof. In this connection it may be stated that any fluid-pressure supply may be utilized in connection with these actuating devices, although it has thus far been preferred to employ air under pressure from any suitable source to insure the operation of the series of superposed actuating devices.

The series of superposed actuating devices 10 are arranged for movement within the same vertical plane in the vertical guideway 11, and suitably connected with the uppermost device or receiver is a rod 12, connected with the gate-operating connection 4, so as to form a part of said connection. The said rod 12 is therefore influenced in its movement by each and all of the actuating devices 10, and when such devices are in a collapsed deflated condition the same will draw upon the gate-operating connection 4 sufficiently to provide for holding the gate-arm up. The series of fluid-pressure receivers has preferably one or more weights 13 arranged on top thereof and sufficiently heavy to provide for holding the gate-arm up when the said devices or receivers are in their normal deflated condition.

As already stated, each of the fluid-pressure receivers is designed to be independently supplied and exhausted of the air or other fluid under pressure for operating the same, and a preferred means for accomplishing this result is shown in the drawings and consists in associating with each air-receiver 10 a fluid-pressure circulating-pipe 14, having a hose or similar tube connection 15 with the receiver 10, and said circulating-pipe 14 is connected to and is in communication with a distributing-valve chamber 16, arranged for support in a suitable position within the supporting-frame 6 of the apparatus, and preferably beneath the working floor 17 of the controlling devices associated with the several valve mechanisms. The several distributing-valve chambers 16 for the several circulating-pipes 14 have connected therewith the pressure-supply pipes 18, coupled with a common supply-pipe 19, leading from a suitable source of fluid-pressure supply— as, for instance, air under pressure in a reservoir or tank. The pressure-supply pipe connection 18 for each distributing-valve chamber 16 is preferably fitted to one side of said chamber at a point between the ends thereof and is in communication with an interior valve-casing 20, which is located wholly within the chamber 16, but is of a sufficiently small size to give a free communication between the opposite ends of the said chamber. The said interior valve-casing 20 is provided in one side, preferably at the bottom, with an outlet-port 21, while the inlet-port 22 thereof is in communication with the supply-pipe connection 18, and within the valve-casing 20 there is arranged an interior valve-seat 23, upon which is arranged to work the pressure-supply valve 24, carried upon the upturned angled valve-supporting arm 25$^a$, extending upwardly through the outlet-port 21 of the casing 20 and forming a part of or carried by the reciprocatory valve-stem 25, passing upwardly through the vent-port 26 at the upper end of the distributing-chamber 16 and having a pivotal slotted connection 26$^a$ at its upper extremity with one end of an oscillatory valve-adjusting lever 27, which valve-adjusting lever is pivotally mounted between its ends by the pivot 28 upon the pendent bracket 29, which is conveniently attached to and suspended from the aforesaid working floor 17. In the normal position of the parts of the individual valve mechanism described the pressure-supply valve 24 is closed upon its seat, thus cutting off the supply of fluid from the receiver 10, associated with said mechanism. With the valve-stem 25 lowered sufficiently to close the valve 24, the exhaust cut-off valve 30, carried by the said stem, is held lowered and away from the valve-seat 31 at the inner end of the vent-port 26, which position of parts permits of a perfectly free exhausting of the air or other fluid from the receiver 10, associated with the mechanism. This action will be hereinafter more particularly referred to in connection with the operation of the complete apparatus.

The oscillatory valve-adjusting lever 27 for each valve mechanism has connected thereto at opposite sides of its pivot the oppositely-arranged vertically-movable plungers 32, working through guide-openings 33, provided in the floor 17 and preferably having at their upper ends heads 34, adapted to be engaged by the valve-mechanism actuator 35, which will be presently referred to. Associated with each valve-adjusting lever 27 is an auxiliary actuating-spring 36, preferably of the bowed form and having its opposite ends made fast, as at 37 and 38, respectively, to the supporting-bracket 29 and to a lever-arm 39, rigid with and carried by the lever 27. The said spring 36 projects laterally to one side of the support 29 for the lever 27, and the tension thereof is sufficiently strong to provide for adjusting the valves 30 and 24 of the valve mechanism when the lever 27 reaches the position where the pressure of the spring can come into play. The spring 36 is important as an auxiliary actuator for the valve mechanism, inasmuch as with it the main actuator 35 can be made comparatively light and only of sufficient weight to move either of the plungers 32 downward until the end 38 of the spring attached to the lever-arm 39 passes the vertical plane of the pivotal point 28. The slotted connection 26ᵃ permits the parts to move to such position under the influence of the main actuator or hammer 35, and then the further movement of the valve-adjusting lever 27—that is, the movement which adjusts the valves 30 and 24—is accomplished by the pressure of the spring 36. Besides the said spring exerting a pressure at one side of the pivot 28 it also necessarily serves in the capacity of a retainer or holding means for the said lever 27 when in either of its positions.

The thrusting downward of either of the oppositely-arranged plungers 32 is accomplished through the medium of the main actuator 35, and in the form of apparatus being now described this actuator preferably is a laterally-swinging hammer pivotally mounted contiguous to its heel end 39ᵃ by the pivot 40 upon a bracket or holder 41, rigidly attached to and carried by a movable support or carriage 42 for the actuator. This movable support or carriage is preferably in the form of a reciprocating slide working in a suitable guide 43, extending longitudinally of the working floor 17, and said slide has a suitable coupling connection 44ᵃ with the gate-operating connection or cable 4, so that the slide will move either forward or backward, according to the movement of the gate-operating connection or cable 4.

The laterally-swinging traveling actuator 35 may be of any suitable construction, but in the form shown is of a divided type consisting of the separate normally-divergent weight members 44, pivotally united upon the pivot 40, upon which the actuator turns or swings, and when the hammer is in an upright position the said separate weight members 44 are normally disposed at opposite sides of the vertical plane of the pivot 40, whereby the actuator or hammer when released from the upper end thereof in a manner to be explained from either side will gravitate downward from its released side and fall upon the upraised plunger 32, which may lie in its path. To prevent a complete separation of the pivotally-united weight members 44, a suitable keeper 45 is associated with said members and loosely embraces one and is attached to the other, whereby the degree of separation thereof is limited. Also it may be observed at this point that the members 44 may be provided with weights sufficiently heavy to provide for adjusting the parts of the valve mechanism to the position already referred to. It has already been explained that the main actuator or laterally-swinging hammer 35 is pivotally mounted contiguous to its heel end 39ᵃ, and this is important, inasmuch as such heel end of the hammer, as well as the longer portion thereof, engages with the resetting device 46, which is mounted upon the working floor 17 at one side of the plane of travel of the pivotal support for the actuator or hammer. This resetting device may be constructed in various ways; but in the simplified form of apparatus it preferably consists of a stepped series of approximately triangular cam projections 47, which project above the plane of the floor 17 and are provided with sigmoidally or spirally twisted active portions or edges 48, which are adapted to be engaged by either the long portion or heel end of the hammer, according to whether the same is traveling forward or backward, said cam projections in either event serving to throw the actuator or hammer into an upright position and into active relation with reference to the holding guideway 49, which guideway is arranged within an elevated support 50, preferably of an arched form and sustained upon the working floor 17, the said guideway being parallel with the working floor and also with the movable support or carriage which carries the actuator or hammer 35.

The holding guideway 49 is designed to receive the upper ends of the weight members 44 of the traveling actuator or hammer 35 and is of a peculiar formation to provide for guiding the swinging or dropping end of the hammer into active position with relation to the drop-openings of the guideway and the electrically-controlled trip-latches supported thereby when the hammer is traveling either forward or backward. The preferred construction of the guideway 49 is plainly shown in Figs. 7 and 9 of the drawings, and the same essentially consists of a strip provided with a longitudinally-disposed channel 51, which is of a width to receive therein the swinging ends of the weight members 44 and to draw such members partly together without entirely closing the same, so that when either weight member of the hammer is released from the guideway the same falls outwardly and overbalances the other member, and thus causes the hammer to gravitate to the side from which it is released.

At regularly-spaced intervals, corresponding to the intervals into which the track is divided up, as will hereinafter more fully appear, the said channeled guideway 49 is provided in its opposite side walls with the drop openings or spaces 52, and in addition to the said transversely-alined drop openings or spaces 52 at intervals in the side walls thereof the said longitudinally-disposed guideway is provided at points intermediate the planes of the transversely-alined openings 52 with diagonally-arranged guiding-webs 53, extending obliquely across the channel 51 and serving to assist in guiding the swinging end of the hammer into the guideway when the former is thrown up into an active position from either side of the longitudinal plane thereof. In connection with the oblique or diagonal guiding-webs 53 the said guideway 49 is provided upon both sides thereof with outwardly-flared entrance-guides 54, the outwardly-flared entrance-guides 54 at each side of the guideway being preferably formed by providing the guideway at intervals between the drop openings or spaces 52 thereof with additional openings, at one side of which are arranged the curved lips 55, said lips, in conjunction with the openings and the diagonal guiding-web 53, forming the entrance-guides; but for the sake of clearness the entrance-guides will be referred to as an entirety without reference to these individual elements composing the same.

In further explanation of the peculiar arrangement of the entrance-guides with reference to the guiding-webs 53 and the drop openings or spaces 52 it will be observed that the outwardly-flared entrance-guides 54 at one side of the guideway are all disposed in one direction, while those at the opposite side of the guideway are disposed in an opposite direction, and the purpose of this is that the guides at one side of the guideway receive the swinging end of the hammer as it pursues its travel in a forward direction, while those at the opposite side of the guideway receive the swinging end of the hammer as the latter travels in a rearward direction, or, in other words, to its initial position or starting-point. Furthermore, the flared entrance-guides at one side of the guideway bear an alternate relation with reference to the entrance-guides at the other side thereof in order to properly receive the hammer or actuator, according to the direction of travel thereof.

In connection with the longitudinal guideway 49 and the several drop-openings 52 thereof there is associated a series of individually and independently actuated trip-latches 56. The trip-latches 56 are so constructed or shaped as to be non-interfering with reference to each other, and all of the same are supported in a longitudinally-alined series upon the holding-guideway 49. Each trip-latch is electrically controlled and, in fact, is practically in the form of an armature, the same being provided at or contiguous to one end with a transversely-arranged armature proper, 57, adapted to play beneath the exposed core ends of the controlling-magnets 58. The controlling-magnets for the several trip-latches 56 are preferably in pairs and coupled together in the usual manner; but in the further description of the case each pair of controlling-magnets will be simply referred to as a "controlling-magnet," which term comprehends the usual pair of coupled magnets employed in electrical apparatus. In referring again to the construction of the individual trip-latches 56 each of the same, to insure positiveness in operation, is preferably of an arched or channeled form, as shown in Fig. 10 of the drawings, and is pivotally mounted between its ends by the pivot 59 upon the longitudinal holding-guideway 49. In addition to the armature proper, 57, each pivotal trip-latch 56 is provided at opposite ends thereof and upon opposite sides with the pendent trip-fingers 60 and 61, respectively. These trip-fingers may be said to be located at diagonally opposite corners of the trip-latch, and the trip-finger 60 may be referred to as a "front" trip, while the other finger constitutes a rear trip, according to the forward travel of the actuator or hammer when the gate-arms are lowering. By reason of the peculiar disposition of the front and rear trips of each individual trip-latch the said front trip will be located at one side of the guideway, so as to operate over one of the drop-openings 52, while the rear trip 61 will be located at the opposite side of the guideway, so as to operate over one of the drop-openings at that side, and, except at the extreme ends of the guideway, where but a single trip-finger is necessarily located, the opposite transversely-alined drop-openings 52 of each pair of such openings are respectively covered and uncovered by the front and rear trips of the adjacent trip-latches. At said extreme ends of the guideway the latter is provided with a closed wall or side 62 opposite the drop opening or space 52 at the opposite side, so that at such points the swinging actuator or hammer can only fall in one direction, as will hereinafter be more obvious as the operation of the apparatus is better understood.

The individual trip-latches 56 have their armature ends or portions normally depressed through the medium of suitable holding-springs 63, suitably fastened at one end to the supporting-frame, as shown in Fig. 7 of the drawings, and connected at the other ends with the trip-latches at one side of the pivot of the latter, thereby normally holding the front trips 60 over the drop-openings with which they are associated, while the rear trips of said latches are held elevated, so as to uncover their drop-openings, and thus leave the guideway perfectly open normally at the side for receiving the actuator or hammer during its backward movement to the starting-point, as will be further explained.

Before taking up the operation of the apparatus as an entirety all of the electrical connections which are associated with the controlling-magnets 58 will now be explained, and with reference to said controlling-magnets 58 for the individual trip-latches 56 the same for clearness in understanding the operation will be additionally designated as magnets A, B, C, and D, respectively, following the order in which they occur, according to the advance or forward movement of the traveling actuator or hammer. Of course any number of these magnets may be employed, according to the number of the individual valve mechanisms and according to the number of sections into which the track is divided, and as the preferable type of apparatus is an entirely automatic one the track connections are the ones preferably employed in order that the apparatus may be exclusively under the control of the moving train, depending for its action upon the direction of travel of the train, whether the same proceeds straight ahead or proceeds forward and then backs or whether the same entirely stops at any point within the circuited or active portion of the track, as premised in the statement of invention.

Referring particularly to the preferable construction and arrangement of parts associated with the track connections, the railway-track at each side of the crossing has one of the rails thereof divided into a number of contact-sections electrically insulated one from the other and designated, respectively, as sections $C'$, $C^2$, $C^3$, and $C^4$, corresponding to the number of controlling-magnets 58, previously referred to, and in this connection it will be observed that the track contact-section $C^4$ is common to both series of contact-sections and, in fact, is of a length to extend entirely over or across the crossing, as plainly shown in diagrammatic Fig. 2 of the drawings. In this figure of the drawings a single track is shown; but it will of course be understood that in a double-track railway the arrangement of track connections could be modified accordingly. The series of contact-sections provided in the track in advance of the crossing which is protected by the gates may be of any suitable length and in the aggregate cover any extent of track desired, according to the character of the crossing, speed of trains required at such point, &c.; but in all events the series of track-sections are so arranged in advance of the crossing that there will be a gradual lowering of the gate-arms in conformity with the movement of the train and a complete closing of the gates by the time the train reaches the crossing.

In a single-track railway the sectional formation of the rail is duplicated at both sides of the crossing and the corresponding sections $C'$ $C'$ $C^2$ $C^2$, &c., at opposite sides of the crossing are electrically united by the bond-wires $a$, so that the apparatus will necessarily be affected the same when the train approaches or recedes from a crossing at either side thereof. In addition to the sectional formation of one of the track-rails, as just described, the opposite track-rail is provided with a central contact-section $C^5$, associated with the main central section $C^4$, for a purpose hereinafter more fully explained.

Before taking up the several wire connections with the sectional rails reference will first be made to an electrical circuit-controller, designated in its entirety by the reference-number 65, which circuit-controller is preferably employed especially in connection with a single-track system largely for the purpose of insuring the immediate opening of the gates as the last car-axle passes off of the center sections of the sectional rails at the crossing. This circuit-controller under some conditions may be omitted from the apparatus; but inasmuch as it is of special utility in connection with the single-track system the same has been illustrated as an intimate part of the apparatus. The said circuit-controller is arranged in any convenient position and preferably within the supporting-frame 6 for the entire apparatus. The same comprises in its general organization a base 66, rigidly supported within the framework 6 and constituting a support for the entire mechanism composing the said controller. Upon the base 66 are arranged two separate circuit-closing instruments 67 and 68, respectively, which instruments comprise means for closing and opening the different circuits in such a way to permit of the carrying out of the operations contemplated by the apparatus. The circuit-closing instrument 67 essentially comprises a pair of separate and independent electromagnets 69 and 70, which are not coupled together and are included in separate circuits, as will presently appear. In addition to the separate magnets 69 and 70 the circuit-closing instrument 67 includes a swinging contact-lever 71, which is pivotally mounted between its ends, as at 72, upon a pivot-bracket 73, arising from the base 66, and at one side of the pivotal point 72 the said contact-lever 71 is provided with a counterbalancing-weight 74, which, however, is sufficiently light to permit the opposite portion of the lever to gravitate to a depressed position, providing, of course, that both of the magnets 69 and 70 are deenergized. The said magnets 69 and 70 are held in an upright position within a holding-frame 75, which is supported at an elevation above the base through the medium of supporting posts or uprights 76. The portion of the armature-lever 71 coöperating with the magnets 69 and 70 is provided with a fork 77, carrying the upper and lower arms 78 and 79, provided with armatures 80 and 81, which respectively coöperate with the upper and lower exposed core ends of the said magnets 69 and 70. The lower armature-carrying arm 79 of the lever-fork 77 is further provided with a contact-bridge 82, which is designed to make and break contact with a plurality of individual spaced contacts 83, which are arranged upon the base 66 of the instrument. The said individual contacts 83 may be of any suitable form—such as posts, springs, mercury-cups, or the like—it only being necessary that their individuality be preserved for separate wiring, while at the same time they are so arranged as to make contact at the same time with the bridge 82, carried by the armature or contact lever 77.

To provide for sustaining the bridge 82 in an inactive position under a condition which will be hereinafter explained the lower armature-carrying arm 79 of the lever 71 is provided beyond the bridge with a guard extension 84 which overlies and is adapted to be engaged by the supporting-shoulder 85 provided upon a depending arm 86 carried at one end of the swinging contact lever 87 of the circuit-closing instrument 68. The said contact or armature lever 87 is pivotally supported as at 88 upon the bracket or arm 89 arranged upon the base 66 of the controller, and at one side of the pivotal point 88 the said lever is formed or provided with an armature portion 90 arranged over the active core ends of the electromagnets 91 of the circuit-closing instrument 68. These magnets 91 consist of the usual pair coupled in series and are not independent of each other, like the pair of magnets 69 and 70 of the instrument 67. The said contact or armature lever 87 of the instrument 68 itself serves as a conductor, and the depending member 86 thereof is a contact-arm adapted to coöperate with the contact-spring or element 92, mounted upon the base 66 and forming, with the arm 86, a circuit-closer.

Proceeding now with the description of the wiring for the various electrical instruments, contacts, &c., already described, this wiring will be followed out in the order which has already been observed with reference to the rail-sections $C'$ $C^2$ $C^3$ $C^4$ and the controlling-magnets A, B, C, and D. The circuit for the first rail-section $C'$, or that section farthest from the railway-crossing, includes a track-wire $b$, having a connection with the said rail-section $C'$ in circuit with the spring circuit-closer 94, to be hereinafter described, and connected with one terminal of the first controlling-magnet A of the series of magnets 58. The other terminal of this magnet A has connected therewith the circuit-wire $c$, having a connection with the battery 95 or other source of electrical energy, and this battery also has connected therewith a battery-wire $d$, which is wired onto the base of the controller 65 and connects with one terminal of the electromagnet 70, the other terminal of which magnet has connected thereto a branch wire $e$, which has a metallic connection at the point 88 with the pivotal support of the armature or contact lever 87, and the circuit being described is completed through this lever, the contacts 86 and 92, and the branch return-wire $f$, wired upon the controller-base and having a connection with the main return-wire $g$, which main return-wire is metallically connected with the side of the rail opposite the sectional or divided rail, so that when an axle of a car or train spans the track between the first rail-section $C'$ and the opposite continuous rail R a circuit will be completed through the wiring described. The circuit for the second rail-section $C^2$ includes a track-wire $h$, connected with the said rail-section $C^2$ in circuit with a spring circuit-closer 96, to be hereinafter described, and connected with one terminal of the second controlling-magnet B of the series of magnets 58. The other terminal of this magnet B has connected therewith the circuit-wire $h'$, having a connection with a battery 97, which battery has connected therewith a battery-wire $i$, which is wired onto the base of the controller and connects with one terminal of the magnet 69, the other terminal of which magnet has connected thereto the branch wire $j$, having a metallic connection similar to the branch wire $e$ with the pivotal support of the lever 87, and the circuit is completed through this lever, the contacts 86 and 92, and the return-wires $f$ and $g$. The circuit for the third rail-section $C^3$ includes a track-wire $k$, connected with said rail-section $C^3$ and leading direct to one terminal of the magnet C, the other terminal of which magnet has connected therewith a circuit-wire $k'$ united with the circuit-wire $c$ for the first magnet A and hence providing a return-circuit for the third controlling-magnet C, which is the same as for the first magnet A. The circuit for the fourth or center rail-section $C^4$ includes a track-wire $l$, leading directly to one terminal of the fourth magnet D of the series of magnets 58. The other terminal of this magnet is united to the circuit-wire $h'$ by means of a branch connection $l'$, thus providing the same return connections for the fourth controlling-magnet as for the second of said magnets, (designated by the letter B.)

It is already explained that there is associated with the central or fourth rail-section $C^4$ a central contact-section $C^5$, arranged in the line of the opposite rail, but insulated therefrom. This central contact-section $C^5$ has connected therewith a track-wire $m$, having a connection with a battery 98, and this battery also has connected therewith the battery-wire $n$, which is wired onto the base of the controller 65 and connects with one terminal of the magnets 91 of the circuit-closing-instrument 68. The other terminal of these magnets has connected thereto a circuit-wire $o$, suitably wired onto the base 66 and also suitably united to the circuit-wire $h'$ to provide for completing a separate circuit over a portion of said wire, the wire $l'$, magnet D, and track-wire $l$ to the rail-section $C^4$, thereby establishing a complete circuit, which includes the magnets of the instrument 68 and the controlling-magnet D when a car-axle connects the rail-sections $C^4$ and $C^5$.

The contact-bridge 82, in connection with the individual spaced contacts 83 of the controller 65, serves the important function of cutting out from their working circuits the controlling-magnets A, B, C, and D when such magnets have performed their functions in accomplishing the closing of the gates, and referring to the wiring for the said contacts 83 it should be first observed that there are necessarily a greater number of said contacts than of the controlling-magnets A, B, C, and D, and for convenience in understanding the function of the contacts the same are additionally designated by the Roman characters I II III IV V VI, and the characters I$^a$, II$^a$, III$^a$, IV$^a$, V$^a$, and VI$^a$ designate corresponding connecting points or posts on the base of the controller, and between the contacts and their corresponding connecting points or posts are arranged the short-circuit wires $p$, $q$, $r$, $s$, $t$, and $u$, respectively. Assuming the bridge-carrying arm of the lever 71 lowered, so that the bridge 82 will contact with the entire series of individual contacts 83, the following short circuits will be established, which cut the controlling-magnets out of use. Short circuit cutting out first controlling-magnet A is rail-section C', wire $b$, connecting-point IV$^a$, wire $s$, contact IV, bridge 82, contact VI, wire $u$, post VI$^a$, battery 95, wire $d$, magnet 70, branch wire $e$, lever 87, contacts 86 92, and return-wires $f$ $g$ to continuous rail R. Short circuit for cutting out second controlling-magnet is rail-section C$^2$, wire $h$, connecting-point III$^a$, wire $r$, contact III, bridge 82, contact V, wire $t$, point V$^a$, wire $o$, wire $h'$, battery 97, wire $i$, magnet 69, wire $j$, lever 87, contacts 86 92, and return-wires $f$ $g$ to continuous rail R. Short circuit for cutting out the third controlling-magnet C is rail-section C$^3$, wire $k$, branch wire $v$, connecting-point II$^a$, wire $q$, contact II, bridge 82, contact VI, and then completing a return through the same wiring as the short circuit for cutting out the first controlling-magnet A. Short circuit for cutting out the fourth controlling-magnet C is central rail-section C$^4$, wire $l$, branch wire $w$, connecting-point I$^a$, wire $p$, contact I, bridge 82, contact V, and then completing the return through the same wiring as the short circuit for cutting out the second controlling-magnet B.

Referring to the spring circuit-closers 94 and 96 included, respectively, in the circuits for the controlling-magnets A and B, it should be explained that each of said circuit-closers consists of a fixed contact 100 and a spring contact-arm 101, the tendency of which is to normally spring away from the fixed contact 100, but which is held in contact therewith to provide for keeping the circuits closed by a bearing-block 102, carried by the slide or carriage 42 for the main actuator 35 and projecting above the plane of the said slide or carriage, so that one edge thereof will bear against the spring-arm 101 and maintain the contact referred to. The circuit-closers 94 and 96 are arranged one in advance of the other, and therefore necessarily perform their functions at different times. The said bearing-block 102, which serves to maintain the circuit-closers 94 and 96 closed, is of such a length as to hold the closer 94 closed until the first controlling-magnet A has entirely performed its work and the third controlling-magnet C is energized, thus providing means for conserving the battery power and concentrating it in the magnet being used, it being observed that the magnets A and C are included in circuits with the same battery. The same action takes place with reference to the circuit-closer 96, inasmuch as the magnets B and D are included in circuits with the same battery, and when the magnet B has entirely performed its work in connection with the trip-latch associated therewith the battery power will be concentrated in the controlling-magnet D, inasmuch as the bearing-block 102 will have then passed to a position permitting of the release of the spring-arm 101 of the closer 96 from the fixed contact 100.

There is preferably associated with the apparatus a suitable signal intended for sounding an alarm either in advance of the closing movement of the gate-arms or at the moment when such movement commences. Different types of signals may be utilized; but a simple construction is shown in the drawings and consists of an alarm-circuit $xy$, including the battery 98 and electrical signal-bell 104 and a normally open circuit-closer 105. This circuit-closer essentially consists of a short rock-shaft 106, provided with an intermediate crank portion 107, receiving the free end of an opening-spring 108, suitably fastened to a fixed point of attachment, as 109, preferably on the working floor 17, and normally exerting an upward pressure upon the crank portion 107 of the rock-shaft 106 to provide for holding the contact-arm 110 out of contact with the contact-spring 111, fitted to the floor 17 and having connected therewith one of the alarm-circuit wires $x$. At the end opposite the contact-arm 110 the rock-shaft 106 is provided with a laterally-projecting trip-finger 112, adapted to ride upon the upper surface of the slide or carriage 42 and also to drop into the notches 113, arranged at regularly-spaced intervals and disposed longitudinally of the said slide or carriage, so as to provide for breaking the alarm-circuit at intervals corresponding to the movement of the gate-arms. This is a desirable feature inasmuch as in the event of a train stopping, thus causing a stoppage of the apparatus, the trip-finger 112 would then lie in one of the notches 113 and permit the opening-spring 108 to come into play and hold the circuit-closer 105 open, thus preventing a loss of battery power and, besides, an unnecessary sounding of the signal.

Referring more particularly to the general operation of the apparatus, it will be assumed in the first instance that a train is approaching the crossing in the direction indicated by the arrow and will successively pass over the several rail-sections and also pass and recede from the crossing. When the first axle of the train reaches the contact C', and thus metalically connects such contact or rail-section with the continuous rail R, a circuit will be at once completed through the controlling-magnet A over the wiring previously described and traced out, thus causing an immediate energization of said magnet. Now it will be understood that the main actuator or swinging hammer 35 will be occupying its initial position within the front end of the guideway 49 and with the magnet A deënergized and the spring 63 holding the front trip 60 of the trip-latch down. Said front trip, in connection with the opposite closed wall 62 of that end of the guideway, will prevent the actuator or hammer from moving laterally in either direction. However, when the magnet A has become energized in the manner stated the trip-latch beneath the same is tilted upon its pivot, thus elevating the front trip thereof out of the way of the swinging end of the actuator or hammer, so that the same may fall by gravity out through the previously-covered drop-opening and onto the plunger 32 at one side of the longitudinal plane of the guideway. Upon striking this plunger the first valve mechanism is adjusted in the manner already explained, thus causing the opening of the supply-valve 24 and the closing of the exhaust cut-off 30, thereby permitting the air or other fluid under pressure to pass into and inflate the upper or first fluid-pressure receiver 10 of the series, which rises and permits the gate-operating connection or cable 4 to ease up and permit the gate-arms to drop a certain distance. This will be the only movement of the gate-arms as long as the first axle of the train is upon the first rail-section C', and when the said first axle of the train reaches the second rail-section $C^2$ the circuit previously described will be completed through the second controlling-magnet B. When this occurs, however, the actuator or hammer 35 will have been readjusted into the guideway 49 with the swinging end thereof in position between the rear trip 61 of the first latch and the front trip 60 of the second latch and is prevented from falling either way prior to the energization of the second controlling-magnet B by reason of the fact that the first magnet is still energized and the rear trip 61 thereof is down. The readjustment of the actuator or hammer to this position is accomplished through the medium of the resetting device 46, as when the hammer falls laterally from its initial position, as described, the longer portion thereof overlies the first cam projection 47 of the series, and as the slide or carriage 42 moves during the initial movement of the gate-operating connection or cable 4 the longer portion of the hammer is forced over and up the twisted active portion or edge 48 of the said cam projection, and will thereby be thrown into an upright position, so that the swinging end thereof will enter the first entrance-guide 54 at the side of the guideway from which the actuator dropped and will be deflected by such entrance-guide into the position referred to ready for the energization of the second controlling-magnet B. Immediately upon the energization of the second controlling-magnet B the trip-latch 56 thereof is drawn up, so that the front trip 60 of such latch is moved out of the way of the actuator or hammer, and it can fall out of the guide again from the same side thereof, and falling upon one of the plungers of the second valve mechanism will cause an adjustment of parts and an inflation of the second air-receiver in like manner as the first, thereby permitting the gate-arm to move still farther toward a closed position, but no farther until the first axle of the train has passed onto the next succeeding or third section $C^3$ of the rail. This operation repeats itself until the hammer has passed the full length of the holding-guideway 49 therefor and has successively actuated each of the valve mechanisms to cause a successive inflation or action of the several actuating devices or fluid-pressure receivers, and it is this operation which causes the gate-arms to move in strict conformity with the position and speed of the train. Still assuming that the train proceeds over the crossing, it should first be noted that during the activity of the several controlling-magnets A, B, C, and D the return from said magnets passes through one or the other of the magnets 69 and 70 of the circuit-closing instrument 67, thereby holding the bridge-carrying end of the armature up from the short-circuiting contacts. However, when the first axle of the train reaches the center section and connects the rail-sections $C^4$ and $C^5$, the magnets 91 of the circuit-closing instrument 68 will be energized by the closing of the circuit, including the said rail-sections $C^4$ and $C^5$, (which circuit has been previously traced out,) thus causing a raising of the contact portion of the lever 87, which breaks the contact at 86 to 92 and necessarily deënergizes the magnets 69 and 70. This deënergization of the magnets 69 and 70 permits the armature end of the lever 71 to fall until the guard extension 84 is arrested by the supporting-shoulder 85, carried by the lever 87. In this position of the parts the armatures 80 and 81 are at equal distances from the opposite core ends of the magnets 69 and 70, so that when the current is again passed through either of said magnets the armature end of the lever 71 will occupy a neutral position. Immediately upon the passing of the last axle of the train off of the center section $C^5$ the circuit, including the instrument 68, is broken and permits the bridge 82 to come in contact with the entire series of contacts 83, thus short-circuiting or cutting out all of the controlling-magnets, so that the trip-latches 56 will all assume normal positions with their rear trips 61 elevated, so as to uncover the drop-openings 52, with which they are associated. This necessarily leaves all of the drop-openings 52 at one side of the guideway open, so that after the actuator or weight has fallen through the drop-opening 52 at the farther end of the guideway and readjusted the last valve mechanism so as to cause a deflation of the last fluid-pressure receiver the actuator is free to be thrown successively up into the entrance-guides and to fall out of the uncovered drop-openings at the open side of the guideway until the actuator or hammer has again reached its initial position within the guideway, as shown in Fig. 9 of the drawings. On the return movement of the actuator or hammer to the initial or starting position the short heel end 39ª thereof will ride under the active edges 48 of the cam projections 47, and will therefore be thrown up into the guideway in the same manner as when the actuator is traveling forward and rides upon the upper sides of the cam projections.

In the above connection it will of course be understood that since the controlling-magnets are cut out in the manner described the return movement of the slide or carriage 42 is continuous, thus providing for an immediate opening of the gates as the last car-axle passes from the center rail-sections at the crossing. Also it will be obvious from the above description that should a train stop before reaching the crossing upon any one of the rail-sections the further movement of the gate-arms will be arrested, and should the train back away from the crossing the magnets will become deënergized, and thus permit the actuator or hammer, no matter what position it may have reached in its travel, to fall from the side of the guideway controlled by the rear trips 61 and start upon its backward travel to the initial position in the same manner as previously explained. This operation involves the complete opening of the gates as the train may back from and pass off of the protected or circuited sections of the track.

In further explanation of the means for operating the circuit-controller 65 and adjusting the parts of the separate circuit-closing instruments it will of course be understood that after the contact-bridge 82, carried by the armature-lever 71, falls in contact with the individual short-circuiting contacts 83 and the magnets 69 and 70 become energized again it is necessary to make provision for resetting the lever 71 to a normal inactive position, when the apparatus itself becomes entirely inactive. Different expedients may be resorted to for accomplishing this result; but a preferred means is shown in the drawings and consists in the employment of a setting or holding arm 120, which has a pivotal or hinged connection 121 with a sliding member or crosshead 122, carried by the gate-operating connection or the piston-rod 12. When the fluid-pressure receivers become deflated, the arm 120 drops upon the weighted portion of the lever 71, but turns upon its pivotal or hinged connection 121, and will not reëlevate the bridge 82 from the contacts until the current is off of the magnets 69 and 70. When this deënergization occurs, the weight of the arm 120 is sufficient to accomplish a resetting of the lever 71 to an inactive position.

As already explained, various modifications of the invention may be resorted to in providing an apparatus comprising means for operating the gates in strict conformity with the position and movement of the train, and in order to illustrate how the general form of apparatus already described may be preserved in a radically different construction the modification illustrated in Figs. 15, 16, 17, and 18 of the drawings is disclosed. In this modification no change is involved in the fluid-pressure receivers 10 nor in the gate-operating connection or cable 4, associated therewith. Also the same valve mechanism for the individual fluid-pressure receivers is used, although the distributing-valve chambers 16 are necessarily arranged in a different position on account of the electrical controlling means for the valve mechanisms being arranged in stepped order at one end of the supporting-frame 6.

In the modification being described the reciprocatory valve-stems 25 of the valve mechanisms have the same slotted connection 26ª with the oscillatory valve-adjusting lever 27, and the only modification of this part of the apparatus resides in omitting the vertically-movable plungers 32 and in place thereof providing the adjusting-lever 27 upon opposite sides of its pivot with the strike-heads 32ª, which are adapted to be engaged by the actuator 114. The main actuator 114 is of a laterally-swinging type in the same sense as the actuator 35, previously described, in order to provide for swinging into engagement with the strike-heads 32ª at both sides of the pivotal support for the lever 27, according as the operation of the apparatus requires the inflation or deflation of the air-receivers. The preferred construction contemplated the employment of an actuator common to all of the valve mechanism, but in the modification each valve mechanism is equipped with its own actuator, and this actuator is in the form of a laterally-swinging weight working in a fixed plane and pivotally supported by the pivot 115 upon a supporting-standard 116, projecting above the valve-adjusting lever 27, and said actuator 114 is provided at one side of the pivot with a short heel extension 117, whereby the actuator when swung to either side of its pivot may be caught by and moved to an upright inactive position by the offstanding angled tappet 118, carried by the vertically-movable slide 119, having a coupling connection 120ª with the gate-operating connection or chain 4, so as to move therewith. It will be obvious that the slide 119 and the several tappets 118 thereof constitute a movable resetting device for the fixedly-supported actuators 114, thereby constituting exactly the reverse of the construction first described, in which the resetting device was fixed and the actuator traveled with the gate-operating connection or cable.

To provide for holding the actuator 114 of each valve mechanism in an upright position and causing the same to fall to either side of its pivotal support, according to whether the gates are opening or closing, the series of controlling-magnets 58ᵃ have associated therewith trip-latches 121ᵃ, pivotally supported intermediate their ends, as at 122ᵃ, and of an approximately arched form, the same being provided at their opposite extremities with the catch-hooks 124, adapted to engage with the lug or projection 125 at one end of the actuator 114. The oppositely-located catch-hooks 124 correspond in relative position and function to the trips at opposite sides of the guideway in the construction previously described.

Associated with each of the trip-latches 121ᵃ is a pivotally-arranged holding-guard 126 in the form, preferably, of a substantially U-shaped yoke having the outer and inner guard-arms 127 and 128, respectively, and pivotally supported at its closed end, as at 129, upon a supporting-standard 130, and at its pivotal point there is preferably arranged an adjusting-spring 131, exerting a pressure or tension upon the yoke 126 in such a direction as to normally tend to move the outer guard-arm 127 away from the adjacent controlling-magnet 58ᵃ. The lower extremity of the outer guard-arm 127 is provided with an inturned catch-finger 132, adapted to engage the lug or projection 125 at the same time as the outermost catch-hook 124 of the trip-latch 121ᵃ in order to obviate the possibility of the actuator falling until it is time for the controlling-magnet associated with the trip-latch therefor to be brought into play. The inner guard-arm 128 is adapted to move to a position at one side of the innermost catch-hook 124, so as to prevent the lug or projection 125 on the actuator being thrown past said hook when thrown to an upright position by the resetting device after having fallen upon the outer end portion of the valve-adjusting lever.

The position of each holding-guard associated with the controlling devices for each valve mechanism is controlled through the medium of an adjusting-arm 133, extending from the upper end of the guard-yoke 126 and provided at its upper end with a laterally-deflected release-finger 134, adapted, under the impulse of the adjusting-spring 131, to move into the notches or notched strips 135, provided upon the resetting-slide 119, as said resetting-slide progresses in its downward movement. The first one of the series of holding-guards 126 has the release-finger 134 thereof in a notch 135, so that the moment that the controlling-magnet A is energized it raises the outer end portion of the trip-latch, so that the actuator is released and free to fall upon the outer portion of the valve-adjusting lever 27 to provide for opening the pressure-supply valve for the first fluid-pressure receiver in a manner already set forth.

By reason of the stepped order of the controlling-magnets and the devices associated therewith the holding-guards 126 for the separate devices are necessarily successively released as the resetting-slide 119 falls.

The wiring for the control of the magnets and all electrical connections are the same for the modification as previously described in connection with the original construction.

While it is of course preferable to provide the track-circuits to secure an automatic operation of the apparatus, still the same could be controlled manually at a distance from the crossing through the medium of a suitable switchboard under the control of the operator—in a switch-tower, for instance. A switchboard of this character is shown in the modification of Fig. 19 of the drawings. This "tower-switch" or "switchboard," as it may be termed, simply would have an arrangement of contacts corresponding with the successive contacts $c'$, $c^2$, $c^3$, and $c^4$ of the track. In the constructions shown the switchboard-base 145 is provided with a succession of contacts 146, 147, 148, and 149, which would have the same wire connections as the track-contacts referred to, and in connection therewith may be employed a switch-lever or slide 150, adapted to be moved successively in contact with the separate contacts, said switch-lever or slide having the common return connection therewith corresponding to the return connection with the continuous rail R of the track.

From the foregoing it is thought that the construction and many advantages of the herein-described apparatus will be readily apparent without further description, and it will be understood that various modifications, as well as changes in the form, proportion, and minor details of construction, may be resorted to without departing from the spirit or sacrificing any of the advantages of the invention.

Having thus described the invention, what is claimed, and desired to be secured by Letters Patent of the United States, is—

1. In an apparatus of the class described, a gate-operating connection, an actuator for said connection comprising means for effecting distinct movements thereof, controlling mechanism acting at intervals upon the actuator to effect its movements, and track devices for causing the operation of the controlling mechanism.

2. In an apparatus of the class described, a gate-operating connection, an actuator for said connection having members arranged to effect distinct movements thereof, controlling mechanism having successively-acting operating devices for the members of the actuator, and track devices for causing an operation of the controlling mechanism.

3. In an apparatus of the class described, a gate-operating connection, an actuator for said connection independent of the track and comprising means for effecting distinct movements of the connection, separate controlling mechanism having successively-acting operating devices for the actuator to effect a gradual closing of the gates, said controlling mechanism also comprising means for operating the actuator to effect a complete opening of the gates as the last axle of the train leaves the crossing, and track instruments for causing an operation of the controlling mechanism.

4. In an apparatus of the class described, a gate-operating connection, an actuator for said connection comprising means for effecting distinct movements thereof, controlling mechanism having successively-acting operating devices for the actuator, and electrical devices controlled from the track, for operating said controlling mechanism.

5. In an apparatus of the class described, a gate-operating connection, an actuator for said connection comprehending a series of actuating devices for successively causing movements of said connection, controlling mechanism having successively-acting operating devices for the said actuating devices, and a series of electrical devices associated with the controlling mechanism and in circuit with insulated sections of the track.

6. In an apparatus of the class described, a gate-operating connection, an actuator independent of the track and comprising a series of actuating devices common to said connection and individually and independently rendered active and inactive, controlling mechanism having successively-acting operating devices for the separate actuating devices of the actuator to effect distinct movements of the gate-operating connection, said controlling mechanism also comprising means for operating the separate actuating devices of the actuator to cause the gates to open continuously and completely as the train leaves the crossing, and electrical devices included in circuits with insulated sections of the track and associated with the controlling mechanism.

7. In an apparatus of the class described, a gate-operating connection, an actuator for said connection having members arranged to effect distinct movements thereof, a series of track contact-sections, and controlling mechanism including a series of instruments in circuit with said sections and having successively-acting operating devices for the members of the actuator.

8. In an apparatus of the class described, the gate-arms counterbalanced to normally fall, a gate-operating connection, an actuator for said connection independent of the track and having members arranged to effect distinct movements of the gate-operating connection, and controlling mechanism having successively-acting operating devices for successively operating the members of the actuator to correspondingly relax the gate-operating connection.

9. In an apparatus of the class described, a gate-operating connection, an automatically-controlled actuator for said connection comprehending a series of actuating devices for successively causing movements of said connection, and separate mechanism controlled by the train on the track, and comprising means for successively operating said actuating devices.

10. In an apparatus of the class described, a gate-operating connection, and an actuator independent of the track and comprising a series of automatically-controlled actuating devices common to said connection and individually and independently rendered active and inactive.

11. In an apparatus of the class described, a gate-operating connection, a plurality of successively-operated actuating devices operatively associated with said connection, separate controlling mechanisms for the individual actuating devices, and means for electrically operating said controlling mechanisms.

12. In an apparatus of the class described, a gate-operating connection, an actuator for said connection independent of the track and comprising a plurality of successively-operated actuating devices common to said gate-operating connection, separate controlling mechanisms for the individual actuating devices, and means for automatically operating said controlling mechanism through the medium of the train.

13. In an apparatus of the class described, a gate-operating connection, and an automatically-controlled fluid-pressure actuator therefor comprising means for successively causing distinct movements of said connection.

14. In an apparatus of the class described, a gate-operating connection, a fluid-pressure actuator therefor comprising means for causing distinct movements of the connection, and electrically-operated controlling means for said fluid-pressure actuator.

15. In an apparatus of the class described, a gate-operating connection, a series of fluid-pressure actuating devices common to said gate-operating connection, and electrically-operated controlling means for successively and independently operating each of the separate fluid-pressure actuating devices to effect an intermittent movement of the gate-operating connection.

16. In an apparatus of the class described, a gate-operating connection, a plurality of successively-operated fluid-pressure actuating devices common to the gate-operating connection for causing an intermittent movement of the latter, separate supply and exhaust mechanisms for said actuating devices, and electrical controlling means for said mechanisms.

17. In an apparatus of the class described, a gate-operating connection, a plurality of successively-operated fluid-pressure actuating devices operatively related to said connection for causing an intermittent movement of the latter, separate supply and exhaust mechanisms for said actuating devices, and means, controlled automatically by the movement of the train, for controlling said mechanisms.

18. In an apparatus of the class described, a gate-operating connection, a plurality of successively-operated fluid-pressure actuating devices operatively related to said connection for causing an intermittent movement of the latter, separate supply and exhaust mechanisms for said actuating devices, electrical controlling means for said mechanisms, and means for individually bringing the separate electrical controlling means into play by the movement of the train with reference to the crossing.

19. In an apparatus of the class described, a gate-operating connection, a series of fluid-pressure actuating devices operatively related to said connection for causing an intermittent movement of the latter, electrically-operated controlling means for successively causing the operation of the separate fluid-pressure actuating devices, means for successively bringing the separate controlling means into play, and means for automatically cutting said controlling means out of action.

20. In an apparatus of the class described, a gate-operating connection, a series of fluid-pressure actuating devices operatively related to the said connection for causing an intermittent movement of the latter, electrically-operated controlling means for successively causing the operation of the separate fluid-pressure actuating devices, means for successively bringing the separate controlling means into play, and means for automatically cutting all of the controlling means out of action when the last axle of the train leaves the crossing.

21. In an apparatus of the class described, a gate-operating connection, a plurality of successively-operated fluid-pressure actuating devices operatively related to said connection for causing an intermittent movement of the latter, separate supply and exhaust valves for said actuating devices, adjusting means for the said valves, and electrically-controlled devices for actuating said adjusting means.

22. In an apparatus of the class described, a gate-operating connection, a plurality of superposed fluid-pressure actuating devices operatively related to said connection, and electrically-controlled means for individually operating said devices.

23. In an apparatus of the class described, a gate-operating connection, a plurality of superposed actuating devices operatively related to the gate-operating connection, and automatically-operated individual controlling means for the separate actuating devices.

24. In an apparatus of the class described, a gate-operating connection, a plurality of superposed collapsible fluid-pressure receivers operatively related to the gate-operating connection, and automatically-operated individual controlling means for the said receivers.

25. In an apparatus of the class described, a gate-operating connection, a plurality of fluid-pressure actuating devices operatively related to said connection for causing an intermittent movement of the latter, separate supply and exhaust mechanisms for said actuating devices, said mechanisms including a source of fluid-pressure supply, and supply and exhaust valves, adjusting devices for the valves of said mechanisms, and automatically-controlled operating means for said adjusting devices.

26. In an apparatus of the class described, a gate-operating connection, a plurality of fluid-pressure actuating devices operatively related to said connection, separate supply and exhaust mechanisms, valve-adjusting means, and means partially controlled through the gate-operating connection for operating the said valve-adjusting means.

27. In an apparatus of the class described, a gate-operating connection, a series of fluid-pressure actuating devices operatively related to said connection for causing an intermittent movement of the latter, separate supply and exhaust mechanisms for the actuating devices, valve-adjusting means for said mechanisms, an actuator for said valve-adjusting means, and electrical controlling devices for said actuator.

28. In an apparatus of the class described, a gate-operating connection, a series of fluid-pressure actuating devices operatively related to said connection and comprising means for causing an intermittent movement of the latter, separate supply and exhaust mechanisms for the actuating devices, valve-adjusting means for said mechanisms, an actuator common to the several valve-adjusting means, and electrical controlling devices for said actuator.

29. In an apparatus of the class described, a gate-operating connection, a series of fluid-pressure actuating devices operatively related to said connection, separate supply and exhaust mechanisms for the actuating devices, each supply and exhaust mechanism including a distributing-valve chamber having a pipe connection with an actuating device, a pressure-supply valve and an exhaust-valve, valve-adjusting means for said several mechanisms, and automatically-controlled operating means for the valve-adjusting means.

30. In an apparatus of the class described, a gate-operating connection, a series of fluid-pressure actuating devices operatively related to said connection and comprising means for causing an intermittent movement of the latter, separate supply and exhaust mechanisms for the actuating devices including suitable valves and stems therefor, a valve-adjusting lever for the valve-stem of each mechanism, an actuator for said lever, and electrical controlling devices for said actuator.

31. In an apparatus of the class described, a gate-operating connection, a series of fluid-pressure actuating devices for causing an intermittent movement of said operating connection, supply and exhaust mechanisms including valves and stems therefor, an oscillatory valve-adjusting lever for the valve-stem of each mechanism, an actuator for moving said lever in either direction, and electrical controlling devices for said actuator.

32. In an apparatus of the class described, a gate-operating connection, a series of fluid-pressure actuating devices for causing an intermittent movement of said operating connection, supply and exhaust mechanisms including suitable valves, a valve-adjusting lever for the valve-stem of each mechanism, a traveling actuator for the levers of the several mechanisms, and automatically-operated controlling devices for said actuator.

33. In an apparatus of the class described, a gate-operating connection, a series of fluid-pressure actuating devices, supply and exhaust mechanisms including suitable valves, an oscillatory adjusting-lever for the valve-stem of each mechanism, a traveling actuator for the levers of the several mechanisms, said actuator being arranged to move in unison with the gate-operating connection and controlled in its travel thereby, and automatically-operated auxiliary controlling devices for said actuator.

34. In an apparatus of the class described, a gate-operating connection, a series of fluid-pressure actuating devices, a supply and exhaust mechanism for each device including suitable valves, an oscillatory adjusting-lever for the stem of each mechanism and having a slotted connection with said stem, an auxiliary actuator connected with each lever, a main actuator for throwing said lever in either direction, and automatically-controlled devices for adjusting the main actuator.

35. In an apparatus of the class described, a gate-operating connection, a series of fluid-pressure actuating devices, a supply and exhaust mechanism for each device including suitable valves, an oscillatory adjusting-lever for the stem of each mechanism, each lever being provided with oppositely-located vertically-movable plungers, a traveling actuator adapted to engage the plungers of each lever at either side of the pivotal point of the latter, and automatically-operated controlling devices for said actuator.

36. In an apparatus of the class described, a gate-operating connection, a series of fluid-pressure actuating devices, supply and exhaust mechanisms for the actuating devices, separate valve-adjusting means for each of said mechanisms, a traveling actuator arranged to move in unison with the gate-operating connection and common to the several valve mechanisms, and electrical controlling devices for said actuator.

37. In an apparatus of the class described, a gate-operating connection, a series of fluid-pressure actuating devices, supply and exhaust mechanisms for said actuating devices, separate valve-adjusting means for each including oppositely-located members, a traveling laterally-swinging actuator for said members, and automatically-operated controlling devices for said actuator.

38. In an apparatus of the class described, a gate-operating connection, a series of fluid-pressure actuating devices, supply and exhaust mechanisms for the actuating devices, separate valve-adjusting means for each including oppositely-located members, a traveling laterally-swinging actuator for said members connected for movement with the gate-operating connection, and automatically-operated controlling devices for said actuator.

39. In an apparatus of the class described, a gate-operating connection, a series of fluid-pressure actuating devices, supply and exhaust mechanisms for the actuating devices, separate valve-adjusting means for each including oppositely-located members, a traveling laterally-swinging actuator for said members, a guideway for the actuator, means for automatically tripping the actuator from its guideway, and means for automatically readjusting the actuator into its guideway.

40. In an apparatus of the class described, a gate-operating connection, a series of fluid-pressure actuating devices, supply and exhaust mechanisms for the actuating devices, separate valve-adjusting means for each including oppositely-located members, a traveling actuator for said members common to the several valve-adjusting means, a guideway for the actuator, means for automatically tripping the actuator from the guideway in the direction of either of the oppositely-located members of any and all of the valve-adjusting means, and means for automatically readjusting the actuator into its guideway.

41. In an apparatus of the class described, a gate-operating connection, a series of fluid-pressure actuating devices, valve mechanisms for the actuating devices, separate valve-adjusting means for each including oppositely-located members, a traveling laterally-swinging actuator for said members consisting of separate pivotally-united weight members, a guideway for receiving and holding the unpivoted ends of the actuator, means for automatically releasing the actuator from its guideway in either direction, and means for automatically readjusting the actuator into its guideway.

42. In an apparatus of the class described, a gate-operating connection, a series of fluid-pressure actuating devices, valve mechanisms for the actuating devices, separate valve-adjusting means for each including oppositely-located members, a traveling laterally-swinging actuator for said members consisting of separate pivotally-united weight members, a pivotal support for the actuator contiguous to its heel end, a guideway for receiving and holding the unpivoted end of the actuator, and means for automatically releasing the actuator from the guideway in either direction, and a resetting device arranged for engagement by either the longer portion or heel end of the actuator to provide for automatically readjusting the same into its guideway.

43. In an apparatus of the class described, a gate-operating connection, a series of fluid-pressure actuating devices, valve mechanisms for the actuating devices, separate valve-adjusting means for each including oppositely-located members, a carriage movable with the gate-operating connection, a laterally-swinging actuator for said members carried by the carriage, a guideway for the actuator, means for automatically tripping the actuator from its guideway, and a resetting device consisting of a series of triangular cam projections arranged at one side of the support for the actuator-carriage and provided with curved edge portions adapted to be engaged by either the long portion or heel end of the actuator.

44. In an apparatus of the class described, a gate-operating connection, a series of fluid-pressure actuating devices, valve mechanisms for the actuating devices, separate valve-adjusting means for each including oppositely-located members, a traveling laterally-swinging actuator for said members, a guideway arranged longitudinally of the path of movement for the actuator and provided with a channel and oppositely-disposed drop-openings, automatically-controlled trips for covering and uncovering said drop-openings, and means for automatically resetting the actuator.

45. In an apparatus of the class described, a gate-operating connection, a series of fluid-pressure actuating devices, valve mechanisms for the actuating devices, separate valve-adjusting means for each, a traveling laterally-swinging actuator for said adjusting means, a guideway for the actuator provided with a longitudinally-disposed channel, side drop-openings and side entrance-guides, automatically-controlled trips, and resetting means for the actuator.

46. In an apparatus of the class described, a gate-operating connection, a series of fluid-pressure actuating devices, valve mechanisms for the actuating devices, separate valve-adjusting means for each, a traveling laterally-swinging actuator for said adjusting means, a guideway for the actuator provided with side drop-openings and side entrance-guides, said entrance-guides upon opposite sides being respectively disposed in opposite directions, electrically-controlled trips for covering and uncovering the drop-openings, and resetting means for the actuator.

47. In an apparatus of the class described, a gate-operating connection, a series of fluid-pressure actuating devices, valve mechanisms for the actuating devices, separate valve-adjusting means for each, a traveling laterally-swinging actuator for said adjusting means, a guideway for the actuator provided with side drop-openings and side entrance-guides, said entrance-guides upon opposite sides being respectively disposed in opposite directions and also bearing an alternate relation, electrically-controlled latches having diagonally opposite trips coöperating with openings respectively upon opposite sides of the guideway, and resetting means for the actuator.

48. In an apparatus of the class described, a gate-operating connection, a series of fluid-pressure actuating devices, valve mechanisms for the actuating devices, separate valve-adjusting means for each, a traveling actuator for said adjusting means, a guideway for the actuator, a series of armature trip-latches associated with the guideway and having trips coöperating with the drop-openings thereof, a series of controlling-magnets for operating the said latches, means for energizing and deënergizing said magnets, and resetting means for the actuator.

49. In an apparatus of the class described, a gate-operating connection, a series of fluid-pressure actuating devices, valve mechanisms for the actuating devices, separate valve-adjusting means for each, a traveling actuator for said adjusting means, a guideway for the actuator, a series of armature trip-latches associated with the guideway and comprising means for tripping the same in either direction, a series of controlling-magnets for operating the said latches, means for successively energizing said magnets, means for automatically cutting said magnets out of play, and means for automatically resetting the actuator into the guideway.

50. In an apparatus of the class described, gate-operating means, controlling mechanism for the gate-operating means including a plurality of controlling-magnets, individual circuits for the controlling-magnets, and a circuit-controller comprising means for automatically short-circuiting the entire series of controlling-magnets.

51. In an apparatus of the class described, gate-operating means, controlling mechanism for the gate-operating means including a plurality of controlling-magnets, individual circuits for the controlling-magnets, and a circuit-controller comprising means for automatically and simultaneously short-circuiting the entire series of controlling-magnets as the last axle of the train leaves the crossing.

52. In an apparatus of the class described, gate-operating means, controlling mechanism for the gate-operating means including a plurality of controlling-magnets, individual circuits for the controlling-magnets, and a circuit-controller comprising means for breaking the working circuits of all of the controlling-magnets when the train reaches the crossing, and for automatically short-circuiting said magnets when the last axle of the train leaves the crossing.

53. In an apparatus of the class described, gate-operating means, controlling mechanism for the gate-operating means including a plurality of controlling-magnets, individual circuits for the controlling-magnets, and a circuit-controller comprising separate electromagnetic circuit-closing instruments, one being normally closed and the other normally open, and the working circuits for the controlling-magnets having a return through the normally open instrument to maintain the same in such condition, means for automatically energizing one instrument and deënergizing the other instrument to permit the latter to short-circuit the controlling-magnets.

54. In an apparatus of the class described, gate-operating means, controlling mechanism for the gate-operating means including a plurality of controlling-magnets, individual working circuits for the controlling-magnets, a circuit-controller comprising separate electromagnetic circuit-closing instruments each having an armature contact-lever, means carried by one of said levers for temporarily holding the other in an inactive position, and operating-circuits including both instruments of the circuit-controller.

55. In an apparatus of the class described, gate-operating means, controlling mechanism for the gate-operating means including a plurality of controlling-magnets, individual working circuits for the controlling-magnets, a circuit-controller comprising separate electromagnetic circuit-closing instruments, one of which includes short-circuiting or cut-out connections for all of the controlling-magnets, and an armature-controlled bridge coöperating with said connections, and means for causing the automatic energization and deënergization of the circuit-closing instruments.

56. In an apparatus of the class described, a gate-operating connection, controlling mechanism for said gate-operating connection including a plurality of controlling-magnets, working circuits for the controlling-magnets, a circuit-controller comprising separate electromagnetic circuit-closing instruments each having a swinging contact-lever, means for causing the automatic energization and deenergization of the circuit-closing instruments, and a setting-arm movable with the gate-operating connection and adapted, when the apparatus is inactive, to rest upon the lever of one of said instruments to hold it in an inoperative position.

57. In an apparatus of the class described, gate-operating means, controlling mechanism for the gate-operating means including a plurality of controlling-magnets included in regular order in the successive working circuits, circuit-closing devices arranged in the separate working circuits, and means for automatically and separately controlling the said circuit-closing devices to provide for concentrating the supply of electrical energy in the magnet being used.

58. In an apparatus of the class described, gate-operating means, controlling mechanism for the gate-operating means including a plurality of controlling-magnets arranged for successive use in regular order, individual working circuits for the controlling-magnets, a circuit-controller, a signal device, and electrical connections including said signal device to provide for automatically actuating the same.

59. In an apparatus of the class described, gate-operating means, controlling mechanism for the gate-operating means including a traveling member, an alarm-circuit including an electrical signal, and a normally open circuit-closer having a member intermittently actuated by said traveling part of the apparatus.

60. In an apparatus of the class described, gate-operating means, electrical controlling mechanism for the gate-operating means including a plurality of controlling-magnets, a series of insulated track contact-sections in advance of the crossing and in circuit with said controlling-magnets, central track contact-sections arranged at the crossing, a circuit-controller, and circuit-wire connections each including said circuit-controller, one of the controlling-magnets and said contact-sections at the crossing.

In testimony whereof I affix my signature in presence of two witnesses.

HENRY C. LAVERY.

Witnesses:
HENRY E. COOPER,
MARIE C. BROWN.